Dec. 27, 1949 J. J. ROOT 2,492,537
ELECTRICAL AMPLIFYING INSTRUMENT
Filed Aug. 2, 1945

INVENTOR
John J. Root
BY S. Stephen Baker
ATTORNEY

Patented Dec. 27, 1949

2,492,537

UNITED STATES PATENT OFFICE 2,492,537

ELECTRICAL AMPLIFYING INSTRUMENT

John J. Root, New York, N. Y.

Application August 2, 1945, Serial No. 608,525

4 Claims. (Cl. 171—95)

This invention relates to electrical measuring instruments and more particularly to an apparatus for amplifying motion or power.

The invention may be used in connection with meters or similar instruments which are designed to respond according to stimulus whether the stimulus be a voltage or a current as produced by a change in pressure, humidity, etc., a change in motion such as is treated in many remote industry systems, or changes of a similar nature. The stimulus accorded to instruments of this type is often extremely slight so that the response of the instrument is consequently limited. When conditions are to be analyzed which cause a very slight change in a recording instrument, considerable difficulties are often encountered because the indications of the change may be so small as to hinder proper interpretation. The scope and accuracy of these instruments are obviously affected by limitations of this nature.

Bearing the foregoing in mind, it is an object of the present invention to provide an apparatus which shall be capable of producing a large response to slight excitation.

Another object of this invention is to provide an electromagnetically operated instrument which shall increase the accuracy of an indicating or translating system. Allied with this object is the provision of such an apparatus for amplifying the power applied thereto.

Other objects of my invention will be apparent from the following description, it being understood that the above general statements of the objects of my invention are intended to describe and not to limit it in any manner.

Referring to the drawings.

Figure 1:
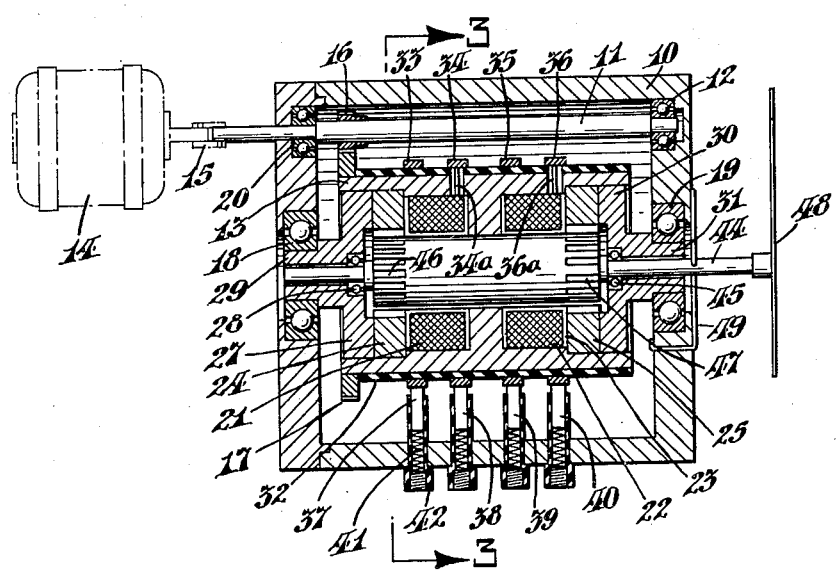
Fig. 1 is a sectional view through the device.
Figure 2:
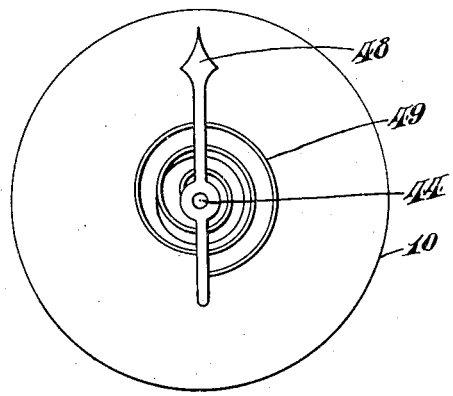
Fig. 2 is an end view thereof.

The device comprises the housing 10 in which the component parts are maintained. A shaft 11 is journalled in opposite walls of housing 10 by anti-friction bearings 12 and 20. Driving power for shaft 11 is supplied by electric motor 14 through coupling 15. A pinion gear 16 is secured to the shaft 11.

Gear 16 is arranged to drive gear 17 on the electromagnetic field structure rotatably mounted in the housing 11 by anti-friction bearings 18 and 19. The electromagnetic field structure comprises a core 13 having the field windings 21 and 22 arranged therein. Reels 23 of plastic material are provided, the field windings 21 and 22 being wound thereon.

A ring member 24 of magnetic material is mounted adjacent one end of the core 13, a similar ring 25 being mounted adjacent the other end.

Figure 3:
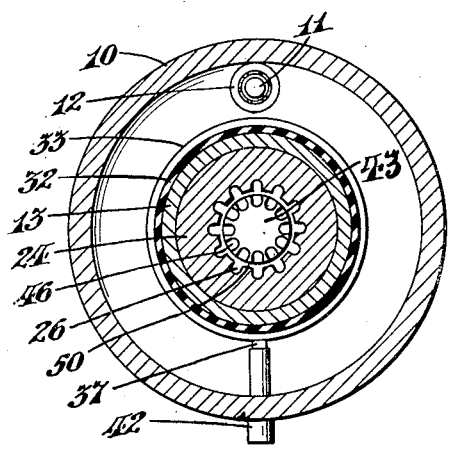
Fig. 3 is a cross-section taken along the line 3—3 of Fig. 1.

As illustrated in Fig. 3, ring 24 is formed with a series of radially disposed slots 26 which may be produced by a milling operation. Ring 25 is similarly formed. End member 27 which may be formed of brass or the like, is similarly mounted within the field structure, the end member 27 serving as a bearing holder for anti-friction bearing 28 and providing a trunnion 29 which is journalled in the bearing 18. End member 30 duplicates the construction of member 27, its trunnion 31 being journalled in the bearing 19.

A sleeve 32 serves to maintain the assembly of the field structure. The sleeve 32 is of electrical insulating material such as Bakelite or similar materials. Maintained around sleeve 32 is a plurality of slip rings 33, 34, 35 and 36 which may be frictionally or otherwise secured to sleeve 32. The slip rings function as pairs arranged to energize field windings 21 and 22 respectively through leads such as 34a and 36a.

Brushes 37, 38, 39 and 40 are provided for transmitting the electric current to the slip rings during their rotation, the usual springs 41 and insulating holders 42 being employed.

An armature 43 is provided with a shaft 44 which is journalled at one end thereof in the bearing 28 of end member 27 and at the other end thereof in a similar anti-friction bearing 45 in the end member 30. Armature 43 is formed at one end with a plurality of radially disposed slots 46 milled therein and equal in number to the slots 26 of ring 24. The other end of armature 43 is likewise formed with a plurality of radial slots 47. It will be observed in Fig. 1, however, that the slots 47 are staggered in lateral relation to the slots 46. This expedient is adopted in order to lend uniformity of electromagnetic co-action between the armature 43 and the field structure as will be hereinafter explained.

Shaft 44 may be provided with an indicating member 48 adapted for rotation therewith. A spiral spring 49 has one terminal thereof mounted in the housing 10 while the other terminal is mounted on the shaft 44. Spring 49 is arranged to provide a force opposing the rotation of armature 43. Thus a measure of the force of rotation of armature 43 is indicated by the extent to which the force of spring 49 is overcome.

The device is operated in the following manner:

Motor 14 is energized so as to rotate shaft 11, thereby causing the rotation of the electromagnetic field structure.

Electrical current generated by a meter or instrument as described above is introduced through slip rings 33 and 34 so as to energize field winding 21, and through slip rings 35 and 36 so as to energize field winding 22 in parallel with winding 21. The flux thereupon generated by winding 21 will flow across the short circular air gap 50 (Fig. 3), through the ring 24, through the core 13 and thence back to the winding 21. Since the air gap 50 may be approximately .005" wide or even less, a magnetic path of high permeability is provided.

The electromagnetic co-action between the ring 24 and armature 43 will be such that the slots 46 of the armature will attempt to align themselves with the slots 26 of the ring since in that position the permeability of the magnetic path is greatest. This action, in effect, locks the armature to the rotating field structure so as to partake of its motion. It is apparent that the locking effect is a function of the flux density which is in turn dependent upon the current flowing through the winding. Thus, motion proportional to the current flow is imparted to the armature 43.

The parallel current flowing in the winding 22 produces flux which takes a similar path as the other end of the device. However, since the slots in the ring 25 are aligned with the slots 26 of ring 24 while the respective slots at each end of armature 43 are misaligned, the armature 43 will be locked in an intermediate position wherein the adjacent slots of the armature and rings are overlapping. While the locking effect is independent of the staggered nature of armature slots 47, this disposition of the slots provides a smoother, more uniform action and avoids jerking of the armature when the windings are energized. However, it is unnecessary to so misalign the slots unless lack of uniformity of electro-magnetic co-action must be avoided.

The motor 14 is arranged to rotate in such a direction that the electro-magnetic coupling of the field structure and armature 43 will cause the armature to wind up the spiral spring 49. The spring 49 is arranged to balance this torque so as to hold the indicator 48 at zero position on a scale, not shown, when no current flows through the instrument. When current is caused to flow, however, the spring 49 will wind up to an extent dependent upon the degree of electro-magnetic coupling applied to the armature. When the spring 49 balances the torque of armature 43, further rotation of the armature is prevented and magnetic slippage between the field structure and armature ensues. Thus the indicator 48 will travel until this position of balance is reached.

It is apparent that the range of the instrument will depend largely upon the nature of spring 49. If it is a stiff spring, large currents will be required to actuate the indicator whereas if it is a delicate spring, minute currents may by measured. Similarly, the spring may have many turns so as to permit the indicator to effect many revolutions before a small current is balanced. Thus, a high degree of amplification can be achieved in that the indicator 48 may be capable of as high as ten or more revolutions in response to slight excitation applied to the field structure.

The advantages of such an instrument will be apparent to those skilled in the art. For example, a small current can, through many ampere-turns, generate an electromagnetic flux of high magnetomotive force. It will be observed that the force applied to the armature is not decreased during the rotation of the indicator 48. In many instruments wherein magnetomotive force acts upon a movable member, the resulting movement creates a gap of increasing reluctance so that the force necessarily diminishes as the movement progresses. In the instant invention, however, the reluctance of the air gap 50 is constant and relatively slight. If desired, a reduction gearing arrangement may be employed in conjunction with indicator 48 so that a coarse scale as well as a fine scale may be provided, a second pointer indicating larger units than that indicated by pointer 49. Similarly, if reciprocating rather than rotating motion of the pointer is desired, the shaft 44 may actuate a rack.

I have shown a preferred embodiment of my invention but it is obvious that numerous changes and omissions may be made without departing from its spirit. For example, while I have illustrated the use of two field windings, it is apparent that a single winding will be effective or that the windings shown may be series instead of parallel connected. With such construction the staggered nature of the armature slots could be dispensed with.

It is further possible to reverse the described transmission of motion in that a motor may be arranged to drive the armature. This would serve to apply a load to motor 14 when excitation was applied to the field structure and the device would function as a dynamometer as will be apparent to those skilled in the art.

I claim:

1. An article of the character described comprising an electromagnetic field member having a series of radially disposed slots formed at both ends thereof, driving means for rotating said field member, an armature member mounted concentrically of said field member and arranged for rotation relative thereto, said armature having a series of radially disposed slots at both ends thereof so as to be respectively concentric and adjacent to said series of field member slots whereby an air gap separates the respective slots of said field member and armature, means to introduce electrical excitation to said field member so as to generate magnetomotive force proportional to said electrical excitation, said magnetomotive force being operative across said air gaps to urge said respective slots of said field member and armature into alignment so as to electromagnetically lock said armature to said rotating field member whereby the rotation of said field member is imparted to said armature to a degree depending upon the strength of said magnetomotive force, and means to translate the imparted rotation of said armature into an indication of the value of said electrical excitation.

2. A device according to claim 1 wherein said translating means comprises a spiral spring arranged to be wound up by said imparted rotation and a means for indicating the degree of said winding up.

3. A device according to claim 1 wherein the respective series of slots at the ends of said armature are relatively staggered.

4. An article of the character described comprising an electromagnetic field member having slots formed therein, an armature member mounted for rotation relative to said field member, said armature member having slots formed therein concentrically arranged in respect to and adjacent to said field member slots, driving means for rotating one of said members, means to energize said field member by an electric current so as to generate an electromagnetic field having a magnetomotive force proportional to said electric current, said magnetomotive force urging said respective slots into alignment whereby said armature member is electromagnetically locked to said field member by a force proportional to said electric current so as to impart rotation of said driven member to the other member to an extent depending upon the value of said electric current, an indicator on said other member, and a spiral spring having one terminal fixed and the other connected to said other member so as to be wound due to the imparted rotation thereof whereby said spiral spring tends to oppose said imparted rotation and the winding of said spring depends upon the relative value of said opposing forces.

JOHN J. ROOT.

REFERENCES CITED

The following references are of record in the file of this patent:

UNITED STATES PATENTS

| Number | Name | Date |
|---|---|---|
| 454,832 | Bennett et al. | June 23, 1891 |
| 993,910 | Thomson | May 30, 1911 |
| 1,382,694 | Towar | June 28, 1921 |
| 1,721,853 | Boykow | July 23, 1929 |
| 1,911,960 | Lipman | May 20, 1933 |
| 2,217,088 | Wilson et al. | Oct. 8, 1940 |
| 2,248,495 | Dupy | July 8, 1941 |